United States Patent
Sauermann et al.

(10) Patent No.: US 7,665,030 B2
(45) Date of Patent: Feb. 16, 2010

(54) TABSTRIP USER INTERFACE ELEMENT FOR FORMULATING BOOLEAN STATEMENTS

(75) Inventors: Volker Sauermann, Heidelberg (DE); Axel Von Bergen, Wiesloch (DE); Arne Schwarz, Heidelberg (DE)

(73) Assignee: SAP Aktiengesellschaft, Walldorf (DE)

( * ) Notice: Subject to any disclaimer, the term of this patent is extended or adjusted under 35 U.S.C. 154(b) by 406 days.

(21) Appl. No.: 10/287,801

(22) Filed: Nov. 5, 2002

(65) Prior Publication Data
US 2004/0085362 A1 May 6, 2004

(51) Int. Cl.
*G06F 3/00* (2006.01)
(52) U.S. Cl. .............................. 715/777; 715/754; 707/3; 707/4
(58) Field of Classification Search ................. 715/777, 715/968, 825, 866; 707/4
See application file for complete search history.

(56) References Cited

U.S. PATENT DOCUMENTS

| | | | | |
|---|---|---|---|---|
| 5,584,024 A | * | 12/1996 | Shwartz | 707/4 |
| 5,592,663 A | * | 1/1997 | Nagamori | 707/5 |
| 5,909,678 A | * | 6/1999 | Bergman et al. | 707/4 |
| 5,950,190 A | | 9/1999 | Yeager et al. | |
| 5,963,938 A | * | 10/1999 | Wilson et al. | 707/4 |
| 6,272,489 B1 | * | 8/2001 | Rauch et al. | 707/4 |
| 6,297,824 B1 | * | 10/2001 | Hearst et al. | 715/848 |
| 6,326,962 B1 | * | 12/2001 | Szabo | 715/762 |
| 6,467,052 B1 | * | 10/2002 | Kaler et al. | 714/39 |
| 6,816,855 B2 | * | 11/2004 | Hartel et al. | 707/4 |
| 6,826,566 B2 | * | 11/2004 | Lewak et al. | 707/4 |
| 6,925,608 B1 | * | 8/2005 | Neale et al. | 715/763 |
| 6,948,134 B2 | * | 9/2005 | Gauthier et al. | 715/804 |
| 7,003,730 B2 | * | 2/2006 | Dettinger et al. | 715/764 |
| 2002/0059297 A1 | | 5/2002 | Schirmer et al. | |
| 2002/0129062 A1 | * | 9/2002 | Luparello | 707/513 |
| 2004/0017395 A1 | * | 1/2004 | Cook | 345/745 |
| 2005/0044100 A1 | * | 2/2005 | Hooper et al. | 707/102 |

FOREIGN PATENT DOCUMENTS

WO    WO 99/10799    3/1999

OTHER PUBLICATIONS

Microsoft Excel 2000 (9.0.6926 SP-3) (Copyright 1985-1999 Microsoft Corporation).*
Microsoft Access 2000 (9.0.6926 SP-3) (Copyright 1992-1999 Microsoft Corporation).*
AVRev.com, CNN Got you Bummin'? Download the New LimeWire 1.7, Sep. 21, 2001, http://www.avrev.com/news/0901/21.limewire.shtml, pp. 1-3.*
Borland et al, Looking for the next Napster, Jul. 5, 2001, pp. 1-5.*
International Search Report dated Jan. 13, 2005 from International Application No. WO 2004/042607 published May 21, 2004. (5 pages).

* cited by examiner

*Primary Examiner*—Ryan F Piraro
(74) *Attorney, Agent, or Firm*—Fish & Richardson P.C.

(57) ABSTRACT

A user interface element for manipulating Boolean expressions includes at least one tab panel element operable to define a term of a Boolean expression with each term including one or more condition statements, and an add tab element operable to add an additional tab panel element. The defined terms of each of the tab panel elements are combined to form the Boolean expression.

29 Claims, 6 Drawing Sheets

FIG. 3

TABSTRIP USER INTERFACE ELEMENT FOR FORMULATING BOOLEAN STATEMENTS

TECHNICAL FIELD

This invention is directed to an element for use in user interfaces, and more particularly, to a tabstrip user interface element for formulating Boolean statements.

BACKGROUND

User interfaces, such as graphical user interfaces (GUIs), provide a mechanism for a user to interact with a computer software application. A GUI typically includes various elements that display information to and/or receive input from a user. GUI elements are sometimes referred to as widgets and may include custom user interface components or standard components such as, for example, scroll bars, push buttons, check boxes, radio buttons, and text panes. Most computer software applications available today provide GUIs to more efficiently interact with users.

As the complexity of user input increases, so to does the complexity of user interface design. However, if a user interface becomes too complex, its usability also may decline. For example, data query systems often provide a structured query language (SQL) interface. SQL queries provide a mechanism for users to express arbitrarily complex database queries. Providing an effective, user-friendly interface for entering SQL queries is a difficult task.

Some SQL query interfaces attempt to constrain the expressiveness of SQL queries to provide a user-friendly interface. For example, a SQL query user interface may be simplified such that a user may simply select one or more search terms, the corresponding fields to search, and an operator to use to combine the result sets. This allows a user to define simple Boolean expressions.

Other SQL query interfaces attempt to maximize functionality. These user interfaces typically provide a text box or other mechanism for a user to enter freeform SQL query expressions. These user interfaces may provide some mechanism for a user to select available operations or fields to assist in designing queries. Such user interfaces may provide maximum functionality to a user. However, these interfaces typically require that the user have prior knowledge of SQL.

Some enterprise business applications allow users to analyze, manipulate, and view various business data. This business data may be stored in an SQL-compliant database or other query system. An SQL query interface may allow a user of an enterprise business application to query business data to assist in a variety of activities such as, for example, data analysis, data visualization, and report generation.

SUMMARY

In one general aspect, a user interface element is provided for manipulating Boolean expressions. The user interface element includes at least one tab panel element operable to define a term of a Boolean expression where each term includes one or more condition statements, and an add tab element operable to add an additional tab panel element. The defined terms of each of the tab panel elements are combined to form the Boolean expression.

In some implementations, each of the condition statements includes an attribute, an operator, and a value. The operator may include, for example, any of the following: equal to, not equal to, less than, less than or equal to, greater than, greater than or equal to, within a range, or outside a range. The condition statements are combined using a term combination operator which may be selectable from a group of available operators, such as, for example, logical-and; and logical-or.

In some implementations, the add tab element is operable to add a logical-and tab such that the term defined by the logical-and tab is combined with terms defined by preceding tab panel elements using a logical-and operation. Alternatively or additionally, the add tab element may be operable to add a logical-or tab such that the term defined by the logical-or tab is combined with terms defined by preceding tab panel elements using a logical-or operation.

The details of one or more implementations are set forth in the accompanying drawings and the description below. Other features and advantages will be apparent from the description and drawings, and from the claims.

DESCRIPTION OF DRAWINGS

FIG. 3 is a screenshot of a tabstrip interface showing the number of targets matching a first search term.

DETAILED DESCRIPTION

To facilitate the definition and modification of SQL queries in enterprise business applications, it is desirable to provide an improved user interface to input arbitrarily complex Boolean expressions. A Boolean expression is an expression formed by applying logical operations to one or more variables, each of which may be "true" or "false." For example, "A and B" is a Boolean expression. The expression evaluates to "true" only if both A and B are "true." Otherwise, the expression evaluates to "false." Boolean expressions may include a variety of logical operations such as, for example, or, exclusive-or, and, not, not-and, not-or, and not-exclusive-or. These logical operations may be combined and nested using parentheses or brackets to specify their order of evaluation.

It may be proved that any Boolean expression may be reduced to a normal form using only two levels of logic. The two most widely used normal forms are the disjunctive normal form (DNF) and the conjunctive normal form (CNF). A DNF expression includes a disjunction (i.e., logical-or) of one or more logical expressions including only the conjunction of variables (each possibly negated). Conversely, a CNF expression includes a conjunction (i.e., logical-and) of one or more logical expressions including only a disjunction of variables (each possibly negated). The table below illustrates a Boolean expression and its corresponding CNF and DNF forms.

TABLE 1

| Boolean Expression | ((A and B) or C ) and D |
|---|---|
| Conjunctive Normal Form | (A or C) and (B or C) and D |
| Disjunctive Normal Form | (A and B and D) or (C and D) |

In the example shown in Table 1, the Boolean expression "((A and B) or C) and D" includes more than two levels of logic. This expression may be normalized in CNF or DNF forms as shown. Because every Boolean expression may be reduced to CNF or DNF form, an interface that allows a user to specify any Boolean expression in CNF or DNF form may be used to specify Boolean expressions of arbitrary complexity. It is desirable to provide an effective user interface for entering and modification of Boolean expressions.

Figure 1:
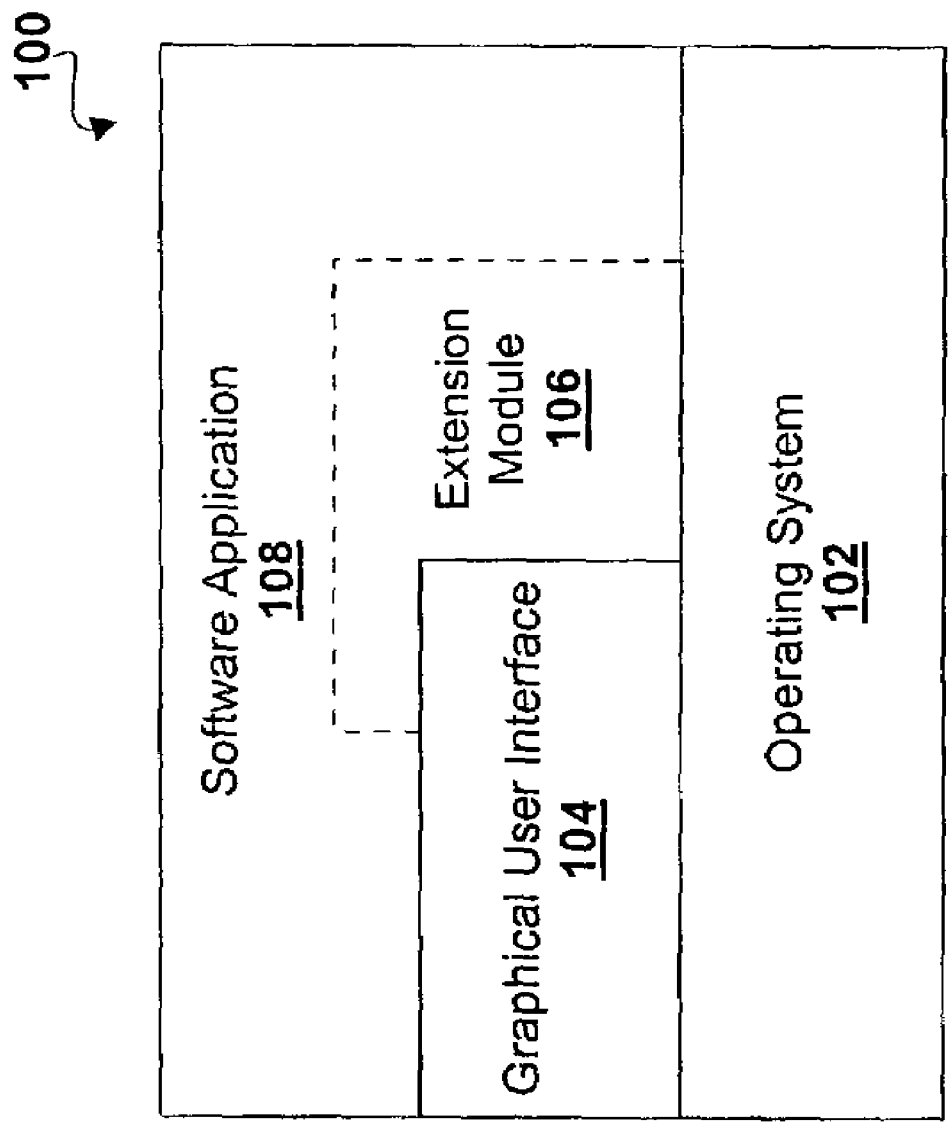
FIG. 1 is a block diagram of a software system using a graphical user interface (GUI) providing a tabstrip interface for entering Boolean expressions.

Referring to FIG 1, software environment 100 includes an operating system 102 providing an interface to hardware input and output devices such as, for example, a keyboard, mouse, printer, display, and network. A graphical user interface (GUI) module 104 provides a library of routines used to implement a GUI. A GUI module 104 also may be provided as part of operating system 102. For example, Microsoft Windows is sold as an operating system; however, it includes an operating system 102 and a GUI module 104. The software environment 100 may include various libraries or extension modules 106 that may be used by a software application 108. In this example, the GUI module 104 uses the underlying operating system 102 to provide a graphical interface for software application 108. Software application 108 also may use the operating system 102, the GUI module 104, and extensions provided by extension module 106. For example, GUI module 104 may include a tabstrip widget to make it easy to define Boolean expressions in software application 108. Further extensions to the operating system 102 and/or the GUI module 104 may be provided by extension module 106.

Figure 2:
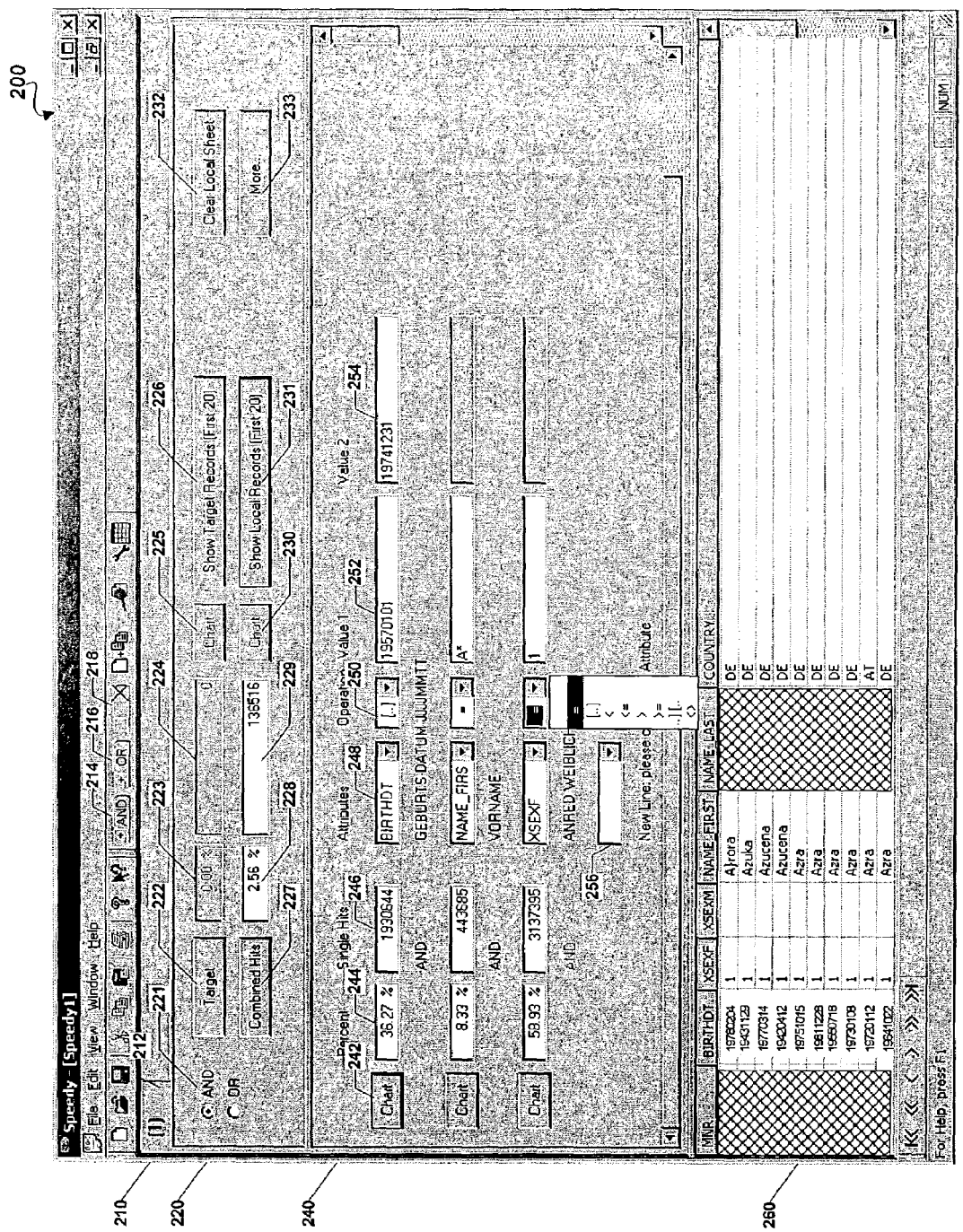
FIG. 2 is a screenshot of a GUI displaying a tabstrip interface for entering Boolean expressions.

Referring to FIG. 2, a software application 108 provides a GUI 200 to facilitate the entry and modification of Boolean expressions. The GUI 200 provides a tabstrip 210 that includes one or more tabs 212, each defining a disjunction or conjunction of a series of variables. An additional tab 212 may be added by selecting button 214 or button 216. Button 214 adds a logical-and tab 212 which allows a user to define one term of a Boolean expression. The term includes one or more conditions that are combined together using a logical operation, such as, logical-and or logical-or. For example, a condition may be the following: "AGE<21." The resulting term is then combined with the preceding terms defined by tabs 212 using logical-and. Similarly, the user may create a new tab to define a term to be combined with the preceding terms using logical-or by selecting button 216. In addition to adding new tabs 212 using button 214 or button 216, a user may also delete a tab using button 218.

When a user selects a tab 212, a corresponding tab summary panel 220 and a tab conditions panel 240 are displayed. The tab summary panel 220 displays information regarding the query defined in the corresponding tab conditions panel 240 and allows a user to configure and combine the panel with the data specified using other tabs 212.

In some implementations, the tab summary panel 220 includes various controls and information displays regarding the term defined by that tab 212 and controls and information displays related to the entire Boolean expression defined by combining each tab 212. For example, the panel includes a logical operator selector 221 to allow a user to select the desired logical operation to be applied in combining the conditions defined in the corresponding tab conditions panel 240.

In this example, the logical operator selector 221 allows a user to choose between a logical-and and a logical-or. If a logical-and is selected, each of the conditions defined in panel 240 are combined together using logical-and. In some implementations, the logical operator selector 221 allows the user to select between other or additional logical operations.

The tab summary panel 220 also includes information displays and controls corresponding to the resulting Boolean expression defined by the combination of each tab 212. When selected, target button 222 updates the defined Boolean expression with the contents of the displayed tab 212. When the target is updated, the target percentage display 223 and the target count display 224 are updated accordingly. The target percentage display 223 indicates the percentage of total data matching the defined Boolean expression while the target count display 224 indicates the total number of matching data elements. A user may view the data matching the defined query by selecting the target data chart button 225. Any known data reporting, data visualization, graphs, or charts may be used to view the corresponding data. Finally, the matching hits may be displayed in spreadsheet format in panel 260 by selecting the show target records button 226.

Each of these information displays and controls (222, 223, 224, 225, and 226) corresponds to the overall Boolean expression defined by the user interface. Information displays and controls similarly are defined for the term described by a single tab 212. For example, the combined hits button 227 may be used to update the display based on the conditions defined in panel 240. When the combined hits button 227 is selected, the system may update various display information, such as, for example, a term percentage display 228 and a term count display 229 to display the percentage of the total data matching the conditions defined in panel 240 and the total count of that matching data. The data may be similarly viewed using term chart button 230 and displayed in spreadsheet format using show local records button 231. Finally, the user may select the clear local sheet button 232 to remove any defined conditions so that the user may restart the process for the displayed tab 212. If additional options are available, they may be selected using the more button 233.

In the example shown in FIG. 1, the user has selected to combine the defined conditions using a logical-and operation. Each of the terms defined in panel 240 are combined using logical-and. Three conditions have been defined. Each condition includes various controls and information displays including a condition chart button 242, a condition percentage display 244, a condition count display 246, an attribute selection 248, an operator selection 250, a first value 252, and a second value 254.

The first condition selects the BIRTHDT attribute using the attribute selection 248. The operation selection 250 specifies a range operation and values 252 and 254 specify the beginning and ending value for that range. Thus, the condition selects birthdays between Jan. 1, 1957 and Dec. 31, 1974. The data meeting this condition may be visualized or otherwise displayed using the condition chart button 242. The second condition selects data where the NAME_FIRST attribute begins with the letter "A." Finally, the third condition selects data where the XSEXF field is "1." As shown in FIG. 2, there are 1,930,644 hits for the first condition, 443,685 hits for the second condition, and 3,137,395 hits for the third condition. Each of these conditions are combined together using logical-and, resulting in 136,516 matching records. When the user clicks on combined hits button 227, the term percentage display 228 is updated to display 2.56% (i.e., the percentage of matching records) and the term count display 229 is updated to display 136,516 (i.e., the total number of matching records). The example shown in FIG. 2 illustrates the use of two operators: equals and within a range. Any operators may be used to define a condition, such as, for example, less than, less than or equal to, greater than, greater than or equal to, equal to, not equal to, within a range, or outside a range.

Any number of conditions may be defined. If additional conditions are desired, a user may add a condition by selecting a new attribute using attribute selector 256. If more conditions are defined than can be displayed in panel 240 at one time, scroll bars may be used. A user may view matching records by selecting the show local records button 231.

Figure 3:
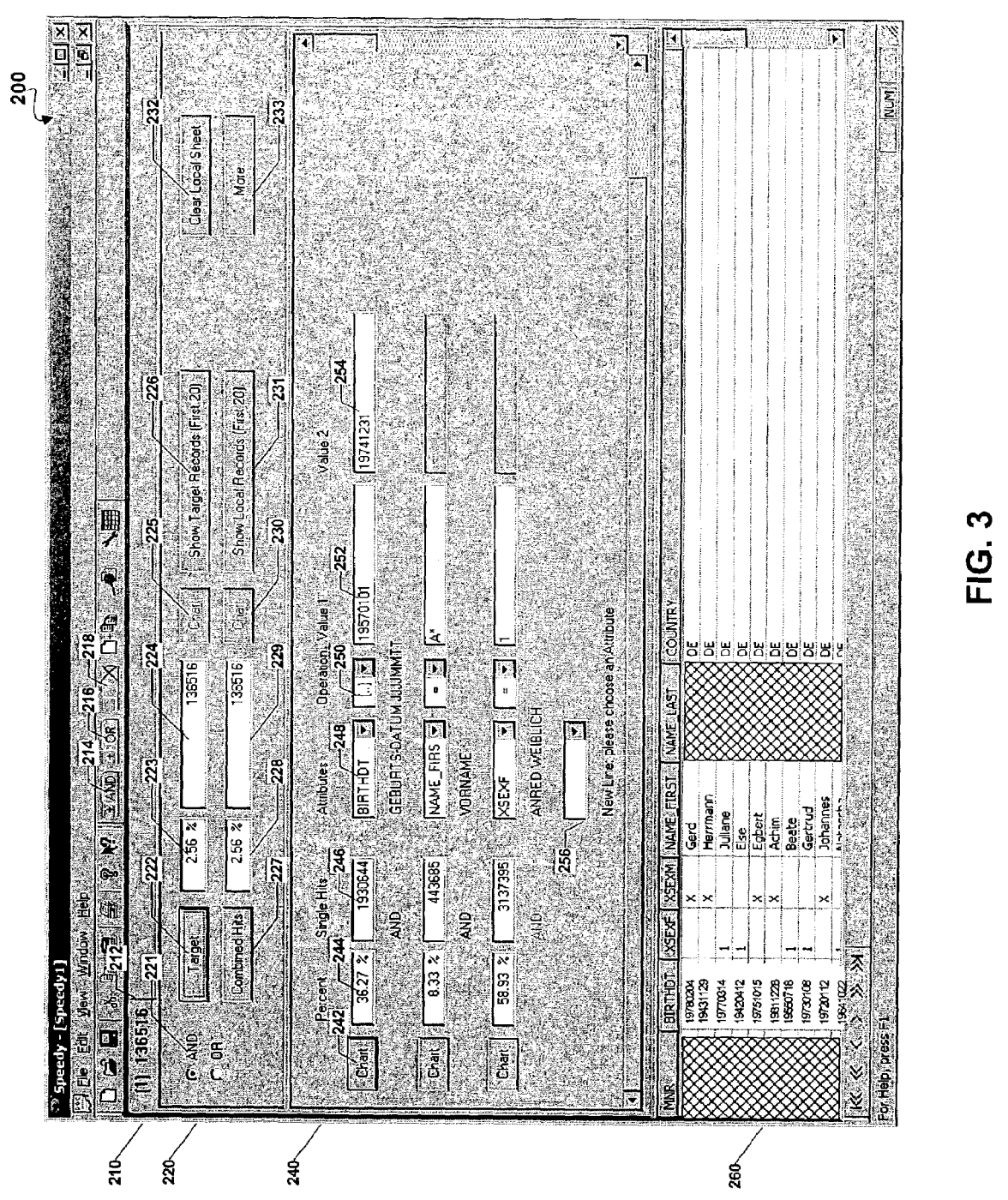

Referring to FIG. 3, once the conditions have been entered, the resulting Boolean expression may be updated by selecting the target button 222. This causes the system to update the target percentage display 223 and the target count display 224. FIG. 3 shows the same data for the target data displays (223 and 224) and the term data displays (228 and 229) because only one term has been defined. As additional terms are added by adding tabs using buttons 214 or 216, the target data will be updated to show the results of the entire Boolean expression as described below.

Figure 4:
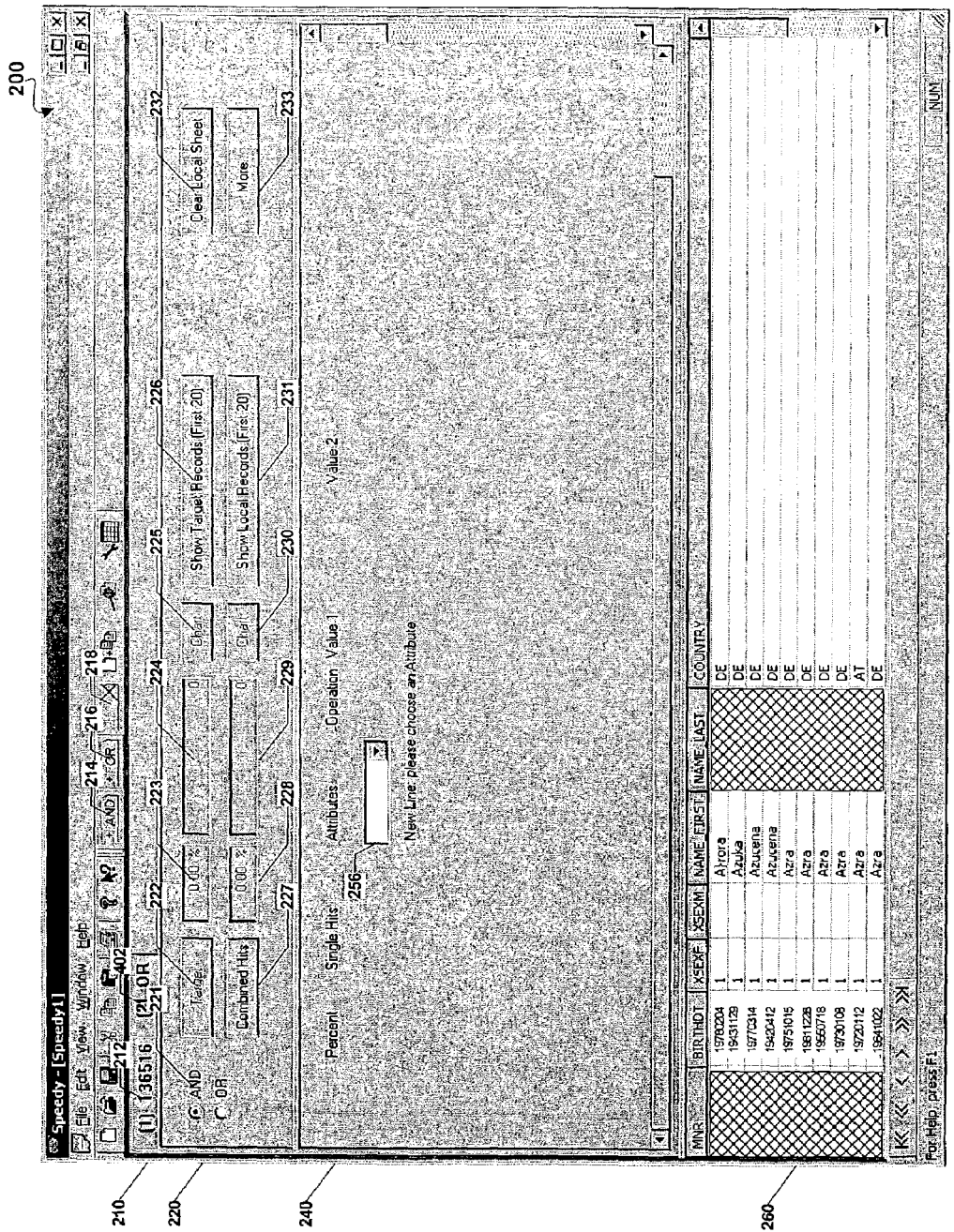
FIG. 4 is a screenshot of tabstrip interface for defining a second search term to be logically combined to the first search term using an "OR" operation.

Referring to FIG. 4, a user may add a second tab 402 to enter an additional term into the Boolean expression. The second tab 402 may be displayed as shown in FIG. 4, or may be placed in a separate window. FIG. 4 shows an added tab 402 to be combined with the preceding tab 212 using a logical-or operation. The term associated with this tab 402 may be defined in the same manner as the first tab 212 as describe above with respect to FIG. 2. The tab panel 240 initially includes no defined conditions. To define a first condition, a user may select an attribute using attribute selector 256. When all desired conditions have been added, the user may select the combined hits button 227 to determine which data satisfies the defined conditions. The conditions are combined using the operation select by logical operator selector 221. The matching data may be viewed by selecting the show local records button 231. If the user is satisfied with the term corresponding to tab 402, the user may combine the data with the term corresponding to tab 212 by selecting the target button 222. The combined hits from tab 212 are combined with the combined hits of tab 402 using a logical-or operation.

Figure 5:
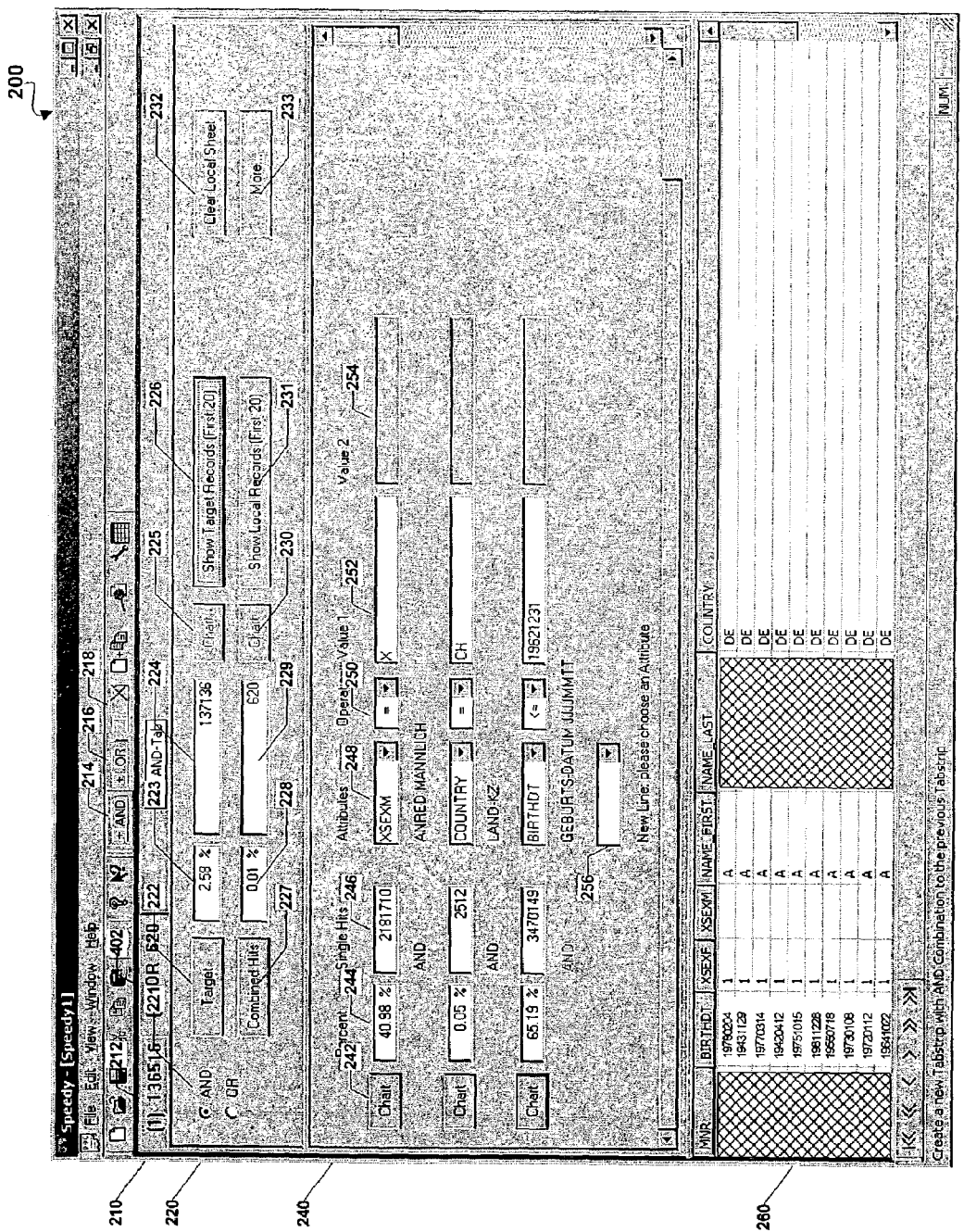
FIG. 5 is a screenshot of a tabstrip interface showing the number of targets matching the first search term and the number of targets matching the second search term.

FIG. 5 illustrates a completed term corresponding to tab 402. A user may enter the term data using the interface shown in FIG. 4 as follows. First, the user selects the "XSEXM" attribute using attribute selector 256. This will change the display to include a condition line. The user then selects the "=" operator using condition operator selector 250. Then, the user enters "X" into the first value 252. This selects all records having the XSEXM attribute equal to "X."

The user then selects the "COUNTRY" attribute using attribute selector 256 to add a second condition to the term corresponding to tab 402. Again, the user selects the "=" operator using the condition operator selector 250. Finally, the user enters "CH" for the first value 252 to select all records with a COUNTRY attribute equal to "CH."

Finally, the user selects the "BIRTHDT" attribute using the attribute selector 256 to add a third condition. For this condition, the user selects the "<=" operator using the condition operator selector 250, entering a value of "19621231" for the first value 252. This selects all records where the BIRTHDT field is less than or equal to 19621231. In this example, the BIRTHDT field represents birthdays, so the condition selects all records where the birthday is on or before Dec. 31, 1962. For each of the three conditions, the selected operators require only one operand, so only the first value field 252 is used. The second value field 254 may simply be unused or may be grayed out to show that it is unused.

Each of the conditions defined in panel 240 is combined using the logical-and operation as indicated by the logical operator selector 221. If the combined hits button 227 is selected, the system selects those records matching each of the three conditions (i.e., performs the logical-and operation). In this case, only 620 records match as shown in display 229. When the target button 222 is selected, the 620 matching records are combined with the 136,516 records matching tab 212 resulting in a total of 137,136 records as shown by display 224.

Figure 6:
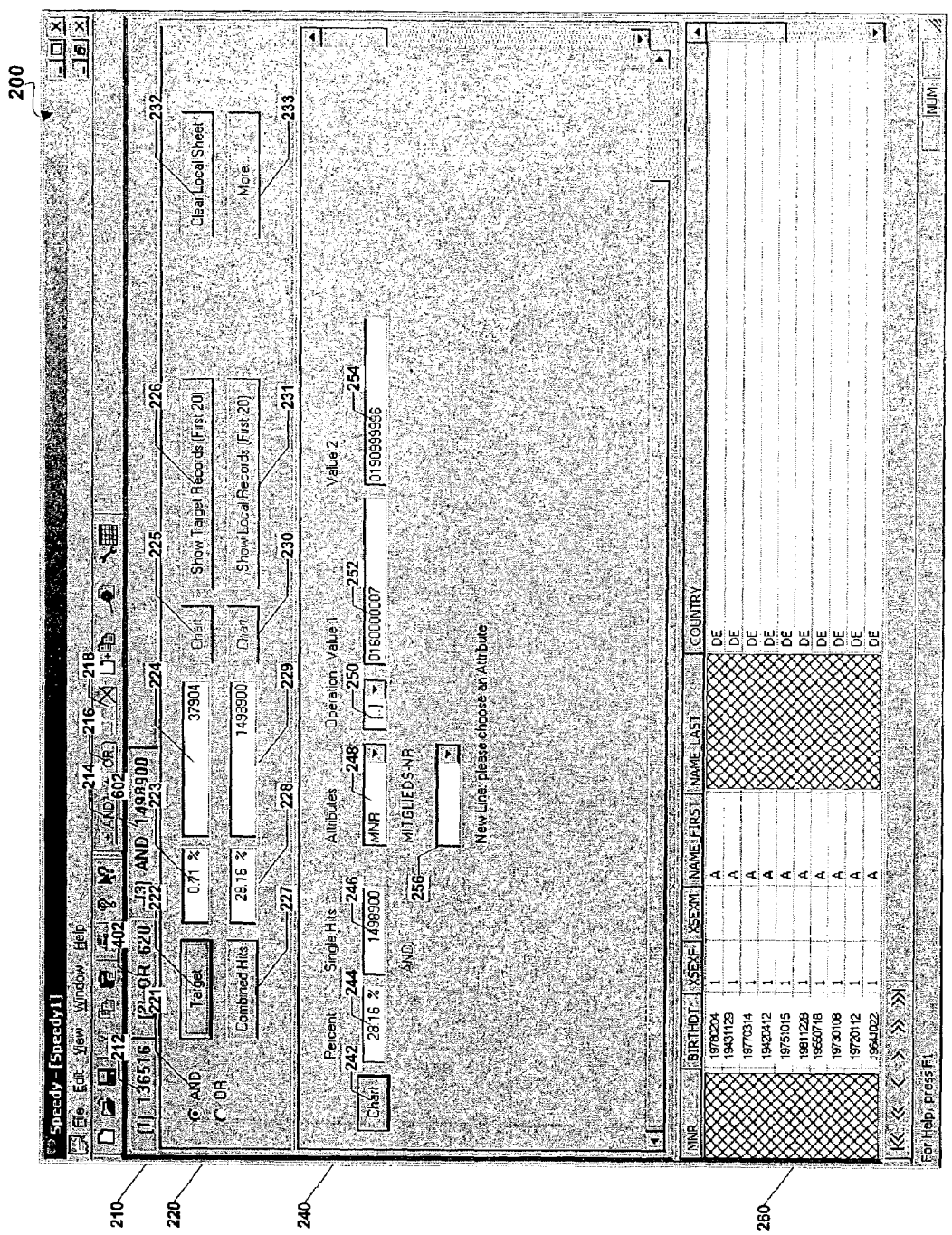
FIG. 6 is a screenshot of a tabstrip interface for entering Boolean expressions with a third search term defined.

Referring to FIG. 6, a third tab 602 is added by selecting button 214. This tab is combined with the previous tabs 212 and 402 using a logical-and operation. For tab 602, the user selects the "MNR" field using the attribute selector 256. The user then selects the operator "[..]" to select records having the MNR attribute value within a defined range between 0160000007 (i.e., first value 252) and 0190999996 (i.e., second value 254). This is the only condition defined. The user may select the combined hits button 227 to determine the number of matching records and then the target button 222 to combine the term with the preceding terms. In this example, there are 1,498,900 matching the defined condition. When these records are combined with the previous 137,136 records using logical-and, the system identifies 37,904 matching records for the Boolean expression.

The tabstrip user interface described above allows a user to enter or edit a Boolean expression including a series of terms corresponding to one or more tabs. Terms may be combined using an operation, such as, logical-and or logical-or. Each term may include one or more conditions selecting various records from a data store. This tabstrip interface allows a user to enter a Boolean expression in conjunctive normal form by selecting button 214 to add tabs 212 to be combined with a logical-and and by selecting logical-or using logical operator selector 221. These selections combine conditions in terms using logical-or and combine terms using logical-and.

Similarly, the GUI 200 may be used to enter Boolean expressions in disjunctive normal form by using button 216 to add tabs that are combined using logical-or and by selecting logical-and using logical operator selector 221 for each tab 212. This combines conditions using logical-and and terms using logical-or. Because any Boolean expression may be reduced to a disjunctive or conjunctive normal form, the GUI 200 may be used to represent any Boolean expression. However, the GUI 200 does not restrict a user to entering Boolean expressions in normal form. A user may add tabs using both button 214 and button 216 and may choose any operator using the logical operator selection 221. In effect, each tabstrip may be used to represent a bracket of a Boolean expression in conjunctive normal form or disjunctive normal form.

The techniques described above provide a useful technique to enter, manipulate, and change query expressions. The GUI 200 allows a user maximum expression capability while minimizing the complexity of the user interface. The examples above describe a graphical user interface for use in a data query system. One skilled in the art will appreciate that the same techniques may be used in a graphical or non-graphical user interface. Additionally, the techniques may be used in any application where Boolean expressions may be entered.

A number of implementations have been described. Nevertheless, it will be understood that various modifications may be made. Accordingly, other implementations are within the scope of the following claims.

What is claimed is:

1. A method comprising:

displaying a tabstrip widget including at least first and second tabs, each tab further including a tab conditions panel and a tab summary panel, the tab summary panel configured to display a first statistic associated with a term of a Boolean expression defined by the corresponding tab conditions panel, a first update element operable to, in response to user selection, update the first statistic, a second statistic associated with the entire Boolean expression, and a second update element operable to, in response to user selection, update the second statistic, and the tabstrip widget being configured to display a tab conditions panel and a tab summary panel of one tab at a time;

receiving a first user input defining a first term of the Boolean expression, the first term further comprising a first number of condition statements joined by a first Boolean operator;

displaying the first term of the Boolean expression including the first number of condition statements in the tab conditions panel of the first tab;

receiving a user selection indicative of a second tab;

superimposing the tab conditions panel of the second tab on the tab conditions panel of the first tab based upon receiving the user selection indicative of the second tab;

receiving a second user input defining a second term of the Boolean expression, the second term further comprising a second number of condition statements joined by the first Boolean operator, the second number of condition statements being different than the first number of condition statements;

displaying the second term of the Boolean expression including the second number of condition statements in the tab conditions panel of the second tab;

receiving a user selection indicative of a third tab;

superimposing the tab conditions panel of the third tab on the tab conditions panels of the first and second tabs based upon receiving the user selection indicative of the third tab;

receiving a third user input defining a third term of a Boolean expression, the third term further comprising a third number of condition statements joined by the first Boolean operator, the third number of condition statements being different than the first number of condition statements and the second number of condition statements;

displaying the third term of the Boolean expression including the third number of condition statements in the tab conditions panel of the third tab;

combining the first, second and third terms using a second Boolean operator, the second Boolean operator being different than the first Boolean operator;

outputting data satisfying the first, second and third terms of the Boolean expression in a chart, a graph, or a spreadsheet;

receiving a fourth user input redefining one of the terms of the Boolean expression;

in response to user selection of the first update element included in the tab summary panel of the second tab, updating the first statistic included in the tab summary panel of the second tab based on the second term of the Boolean expression including the second number of condition statements; and in response to user selection of the second update element included in the tab summary panel of the second tab, updating the second statistic included in the tab summary panel of the second tab based on the entire Boolean expression defined by the first term of the Boolean expression including the first number of condition statements, the second term of the Boolean expression including the second number of condition statements, and the third term of the Boolean expression including the third number of condition statements.

2. A method comprising:

displaying a tabstrip widget including at least first and second tabs, each of the at least first and second tabs further including a tab conditions panel and a tab summary panel, the tab summary panel configured to display a first statistic associated with a term of a Boolean expression defined by the corresponding tab conditions panel, a first update element operable to, in response to user selection, update the first statistic, a second statistic associated with the entire Boolean expression, and a second update element operable to, in response to user selection, update the second statistic, and the tabstrip widget being configured to display one tab conditions panel of the at least first and second tabs at a time;

receiving a first user input defining a first term of a Boolean expression including a first number of condition statements;

displaying the first term of the Boolean expression in the tab conditions panel of the first tab;

superimposing the tab conditions panel of the second tab on the tab conditions panel of the first tab;

receiving a second user input defining a second term of the Boolean expression including a second number of condition statements, the second number of condition statements being different than the first number of condition statements;

displaying the second term of the Boolean expression in the tab conditions panel of the second tab;

in response to user selection of the first update element included in the tab summary panel of the second tab, updating the first statistic included in the tab summary panel of the second tab based on the second term of the Boolean expression including the second number of condition statements;

in response to user selection of the second update element included in the tab summary panel of the second tab, updating the second statistic included in the tab summary panel of the second tab based on the entire Boolean expression defined by the first term of the Boolean expression including the first number of condition statements and the second term of the Boolean expression including the second number of condition statements; and outputting data satisfying the first and second terms of the Boolean expression.

3. The method of claim 2, further comprising:

superimposing the tab conditions panel of a third tab on the tab conditions panels of the first and second tabs;

receiving a third user input defining a third teem of a Boolean expression including a third number of condition statements, the third number of condition statements being different than the first number of condition statements and the second number of condition statements;

displaying the third term of the Boolean expression in the tab conditions panel of the third tab; and outputting data satisfying the first, second and/or third terms of the Boolean expression.

4. The method of claim 2, further comprising receiving user selection indicative of the second tab, wherein the tab conditions panel of the second tab is superimposed on the tab conditions panel of the first tab based upon receiving the user selection.

5. The method of claim 2, wherein the first statistic included in the tab summary panel of the second tab includes a percentage and a count of total data matching the second term of the Boolean expression and the second statistic included in the tab summary panel of the second tab includes a percentage and a count of total data matching the entire Boolean expression.

6. The method of claim 2,
wherein each term further comprises a plurality of Boolean expressions,
wherein each of the Boolean expressions comprising the first term and the second term include a first Boolean operator,
wherein the first term and the second term are combined using a second Boolean operator, and
wherein the first and second Boolean operators are different.

7. The method of claim 6,
wherein the first Boolean operator is a logical-and operator, and
wherein the second Boolean operator is a logical-or operator.

8. The method of claim 2, wherein each term defines a disjunction or a conjunction of a series of variables.

9. The method of claim 2, wherein each tab further comprises a logical operator selector effectuating the selection of a desired logical operation to be applied to the term of the Boolean expression displayed by the each tab.

10. The method of claim 2, wherein the data is output in a graph, a chart or a spreadsheet.

11. The method of claim 2, further comprising receiving a third user input redefining the first term of the Boolean expression, the redefined first term of the Boolean expression including a third number of condition statements that is different than the first number of condition statements.

12. The method of claim 2, further comprising de-activating the tab conditions panel of the first tab based upon superimposing the tab conditions panel of the second tab on the tab conditions panel of the first tab.

13. The method of claim 2, further comprising hiding the tab conditions panel of the first tab based upon superimposing the tab conditions panel of the second tab on the tab conditions panel of the first tab.

14. The method of claim 2, further comprising superimposing the tab conditions panel of the first tab on the tab conditions panel of the second tab.

15. A computer program product tangibly embodied in a machine-readable storage medium, wherein the computer program product comprises instructions that, when read by a machine, operate to cause a data processing apparatus to:
display a tabstrip widget including at least first and second tabs, each of the at least first and second tabs further including a tab conditions panel and a tab summary panel, the tab summary panel configured to display a first statistic associated with a term of a Boolean expression defined by the corresponding tab conditions panel, a first update element operable to, in response to user selection, update the first statistic, a second statistic associated with the entire Boolean expression, and a second update element operable to, in response to user selection, update the second statistic, and the tabstrip widget being configured to display one tab conditions panel of the at least first and second tabs at a time;

receive a first user input defining a first term of a Boolean expression including a first number of condition statements;
display the first term of the Boolean expression in the tab conditions panel of the first tab;
superimpose the tab conditions panel of the second tab on the tab conditions panel of the first tab;
receive a second user input defining a second term of the Boolean expression including a second number of condition statements, the second number of condition statements being different from the first number of condition statements;
display the second term of the Boolean expression in the tab conditions panel of the second tab;
in response to user selection of the first update element included in the tab summary panel of the second tab, update the first statistic included in the tab summary panel of the second tab based on the second term of the Boolean expression including the second number of condition statements;
in response to user selection of the second update element included in the tab summary panel of the second tab, update the second statistic included in the tab summary panel of the second tab based on the entire Boolean expression defined by the first term of the Boolean expression including the first number of condition statements and the second term of the Boolean expression including the second number of condition statements; and
output data satisfying the first and second terms of the Boolean expression.

16. A system comprising:
one or more computers; and
a computer-readable medium coupled to the one or more computers having instructions stored thereon which, when executed by the one or more computers, cause the one or more computers to perform operations comprising:
displaying a tabstrip widget including at least first and second tabs, each tab further including a tab conditions panel and a tab summary panel, the tab summary panel configured to display a first statistic associated with a term of a Boolean expression defined by the corresponding tab conditions panel, a first update element operable to, in response to user selection, update the first statistic, a second statistic associated with the entire Boolean expression, and a second update element operable to, in response to user selection, update the second statistic, and the tabstrip widget being configured to display a tab conditions panel and a tab summary panel of one tab at a time,
receiving a first user input defining a first term of the Boolean expression, the first term further comprising a first number of condition statements joined by a first Boolean operator,
displaying the first term of the Boolean expression including the first number of condition statements in the tab conditions panel of the first tab,
receiving a user selection indicative of a second tab,
superimposing the tab conditions panel of the second tab on the tab conditions panel of the first tab based upon receiving the user selection indicative of the second tab,
receiving a second user input defining a second term of the Boolean expression, the second term further comprising a second number of condition statements joined by the first Boolean operator, the second number of condition statements being different than the first number of condition statements, displaying the second term of the Boolean expression including the second number of condition statements in the tab conditions panel of the second tab, receiving a user selection indicative of a third tab, superimposing the tab conditions panel of the third tab on the tab conditions panels of the first and second tabs based upon receiving the user selection indicative of the third tab, receiving a third user input defining a third term of a Boolean expression, the third term further comprising a third number of condition statements joined by the first Boolean operator, the third number of condition statements being different than the first number of condition statements and the second number of condition statements, displaying the third term of the Boolean expression including the third number of condition statements in the tab conditions panel of the third tab, combining the first, second and third terms using a second Boolean operator, the second Boolean operator being different than the first Boolean operator, outputting data satisfying the first, second and third terms of the Boolean expression in a chart, a graph, or a spreadsheet, receiving a fourth user input redefining one of the terms of the Boolean expression, in response to user selection of the first update element included in the tab summary panel of the second tab, updating the first statistic included in the tab summary panel of the second tab based on the second term of the Boolean expression including the second number of condition statements, and in response to user selection of the second update element included in the tab summary panel of the second tab, updating the second statistic included in the tab summary panel of the second tab based on the entire Boolean expression defined by the first term of the Boolean expression including the first number of condition statements, the second term of the Boolean expression including the second number of condition statements, and the third term of the Boolean expression including the third number of condition statements.

17. A system comprising:

one or more computers; and a computer-readable medium coupled to the one or more computers having instructions stored thereon which, when executed by the one or more computers, cause the one or more computers to perform operations comprising:

displaying a tabstrip widget including at least first and second tabs, each of the at least first and second tabs further including a tab conditions panel and a tab summary panel, the tab summary panel configured to display a first statistic associated with a term of a Boolean expression defined by the corresponding tab conditions panel, a first update element operable to, in response to user selection, update the first statistic, a second statistic associated with the entire Boolean expression, and a second update element operable to, in response to user selection, update the second statistic, and the tabstrip widget being configured to display one tab conditions panel of the at least first and second tabs at a time, receiving a first user input defining a first term of a Boolean expression including a first number of condition statements, displaying the first term of the Boolean expression in the tab conditions panel of the first tab, superimposing the tab conditions panel of the second tab on the tab conditions panel of the first tab, receiving a second user input defining a second term of the Boolean expression including a second number of condition statements, the second number of condition statements being different than the first number of condition statements, displaying the second term of the Boolean expression in the tab conditions panel of the second tab, in response to user selection of the first update element included in the tab summary panel of the second tab, updating the first statistic included in the tab summary panel of the second tab based on the second term of the Boolean expression including the second number of condition statements, in response to user selection of the second update element included in the tab summary panel of the second tab, updating the second statistic included in the tab summary panel of the second tab based on the entire Boolean expression defined by the first term of the Boolean expression including the first number of condition statements and the second term of the Boolean expression including the second number of condition statements, and outputting data satisfying the first and second terms of the Boolean expression.

18. The system of claim 17, wherein the operations further comprise:

superimposing the tab conditions panel of a third tab on the tab conditions panels of the first and second tabs;

receiving a third user input defining a third term of a Boolean expression including a third number of condition statements, the third number of condition statements being different than the first number of condition statements and the second number of condition statements;

displaying the third term of the Boolean expression in the tab conditions panel of the third tab; and outputting data satisfying the first, second and/or third terms of the Boolean expression.

19. The system of claim 17, wherein the operations further comprise receiving user selection indicative of the second tab, wherein the tab conditions panel of the second tab is superimposed on the tab conditions panel of the first tab based upon receiving the user selection.

20. The system of claim 17, wherein the first statistic included in the tab summary panel of the second tab includes a percentage and a count of total data matching the second term of the Boolean expression and the second statistic included in the tab summary panel of the second tab includes a percentage and a count of total data matching the entire Boolean expression.

21. The system of claim 17, wherein each term further comprises a plurality of Boolean expressions, wherein each of the Boolean expressions comprising the first term and the second term include a first Boolean operator, wherein the first term and the second term are combined using a second Boolean operator, and wherein the first and second Boolean operators are different.

22. The system of claim 21,
wherein the first Boolean operator is a logical-and operator, and
wherein the second Boolean operator is a logical-or operator.

23. The system of claim 17, wherein each term defines a disjunction or a conjunction of a series of variables.

24. The system of claim 17, wherein each tab further comprises a logical operator selector effectuating the selection of a desired logical operation to be applied to the term of the Boolean expression displayed by the each tab.

25. The system of claim 17, wherein the data is output in a graph, a chart or a spreadsheet.

26. The system of claim 17, wherein the operations further comprise receiving a third user input redefining the first term of the Boolean expression, the redefined first term of the Boolean expression including a third number of condition statements that is different than the first number of condition statements.

27. The system of claim 17, wherein the operations further comprise de-activating the tab conditions panel of the first tab based upon superimposing the tab conditions panel of the second tab on the tab conditions panel of the first tab.

28. The system of claim 17, wherein the operations further comprise hiding the tab conditions panel of the first tab based upon superimposing the tab conditions panel of the second tab on the tab conditions panel of the first tab.

29. The system of claim 17, wherein the operations further comprise superimposing the tab conditions panel of the first tab on the tab conditions panel of the second tab.

* * * * *